United States Patent
Poikselkä et al.

(10) Patent No.: US 7,145,997 B2
(45) Date of Patent: Dec. 5, 2006

(54) METHOD AND SYSTEM FOR CALLBACK IN CASE OF AN EMERGENCY SESSION

(75) Inventors: Miikka Poikselkä, Espoo (FI); Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 215 days.

(21) Appl. No.: 10/005,356

(22) Filed: Dec. 7, 2001

(65) Prior Publication Data

US 2003/0108175 A1    Jun. 12, 2003

(51) Int. Cl.
*H04M 3/42* (2006.01)

(52) U.S. Cl. ................. 379/210.01; 379/229; 370/352

(58) Field of Classification Search ........... 379/201.01, 379/207.02, 210.01, 211.01, 211.02, 221.08, 379/229; 455/404, 414; 370/352
See application file for complete search history.

(56) References Cited

U.S. PATENT DOCUMENTS

| | | | | |
|---|---|---|---|---|
| 5,095,480 A | * | 3/1992 | Fenner | 370/238 |
| 5,689,548 A | * | 11/1997 | Maupin et al. | 455/404.1 |
| 5,712,900 A | * | 1/1998 | Maupin et al. | 455/433 |
| 5,943,403 A | * | 8/1999 | Richardson et al. | 379/88.26 |
| 6,075,853 A | * | 6/2000 | Boeckman et al. | 379/221.09 |
| 6,332,022 B1 | * | 12/2001 | Martinez | 379/220.01 |
| 6,571,092 B1 | * | 5/2003 | Faccin et al. | 455/404.1 |
| 6,678,735 B1 | * | 1/2004 | Orton et al. | 709/230 |
| 7,058,068 B1 | * | 6/2006 | Gawargy et al. | 370/410 |
| 2002/0136363 A1 | * | 9/2002 | Stumer et al. | 379/45 |

OTHER PUBLICATIONS

Bos, Lieve et al. Toward an All-IP-Based UMTS System Architecture. Jan. 2001. IEEE Network.*

* cited by examiner

*Primary Examiner*—Bing Q. Bui
(74) *Attorney, Agent, or Firm*—Squire, Sanders & Dempsey L.L.P.

(57) ABSTRACT

The invention relates to a method and system for enabling a callback from an entity to an equipment initiating a session wherein nodes involved in handling the session, are adapted to store information for the session, preferably for a predetermined time from the beginning of the session. The information includes an address of at least one other node in the signalling path, and may also include an identity of the equipment. The at least one other node will be used, in case of callback, to carry signalling related to callback from the entity to the equipment. Preferably, signalling bearer for establishing the session is maintained for a certain time from the beginning of the signalling bearer activation. The nodes preferably are IMS nodes and include P-CSCF, S-CSCF, or MGCF node.

25 Claims, 2 Drawing Sheets

METHOD AND SYSTEM FOR CALLBACK IN CASE OF AN EMERGENCY SESSION

FIELD AND BACKGROUND OF THE INVENTION

The invention generally relates to callback in case of a session, e.g. an emergency session, and in particular to a callback feature when the UE (User Equipment) does not have USIM (Universal Subscriber Identity Module).

When a caller initiates a session, e.g. calls to an emergency center, and accidently the session is not properly established, e.g. the call is lost, then there may exist a need that the called party, e.g. the emergency center has to be able to recall to the caller. For example a kid may call to the emergency center, simply tells "the house is on fire", and then hangs up. In this case, it would be preferable if the emergency center could call back and ask e.g. for the street address. For such a call-back, the called entity, e.g. the emergency center needs some information on the identity, e.g. number, of the call originating equipment. The invention aims at providing a solution for such problem in case the caller does not provide such identity information, e.g. when the UE does not have USIM.

SUMMARY OF THE INVENTION

The present invention provides a method, system and device as defined in the independent claims or any one of the dependent claims.

When a session, e.g. an emergency session, from an equipment, e.g. a UE, to an entity, e.g. an emergency center, has been prematurely terminated, a callback can be established from the entity to the equipment initiating the session from the equipment to/via the entity. The entity and/or nodes involved in handling the session, store information for the session, the information including an address of at least one other node in the signalling path, the at least one other node in case of callback being used to carry signalling related to callback from the entity to the equipment. The stored information may be different for each node or entity, and may also include the identity of the equipment.

The information for the session is preferably stored for a predetermined time after the session initiation.

The nodes, e.g. IMS nodes, store the information preferably in the form of records for the session-initiating equipment, e.g. the emergency-session-initiating equipment, e.g. UE, preferably during a certain time from the beginning of the initiation of the session, e.g. emergency session. The records will usually be different for the different nodes and include an address of at least one other node in the signalling path, the at least one other node in case of callback being used to carry signalling related to callback from the entity to the equipment. The address can be the IP address of the next or preceding node in the signalling path. The record may also include an equipment (UE) identity e.g. IMEI, emergency IMSI, UE IP address. With this information, it is possible to carry signalling related to callback from the called terminal (e.g. emergency center) or any intermediate node to the UE. This is in particular of advantage when the UE does not have USIM, and thus normal IMS procedures can not be used to route callback signalling to the UE.

The information stored in the record is preferably received when receiving UE initiated SIP INVITE.

In accordance with one aspect of the invention, a method, system, and device are provided for allowing callback for emergency sessions even if the UE does not have USIM.

DETAILED DESCRIPTION OF PREFERRED EMBODIMENTS OF THE INVENTION

Figure 1:
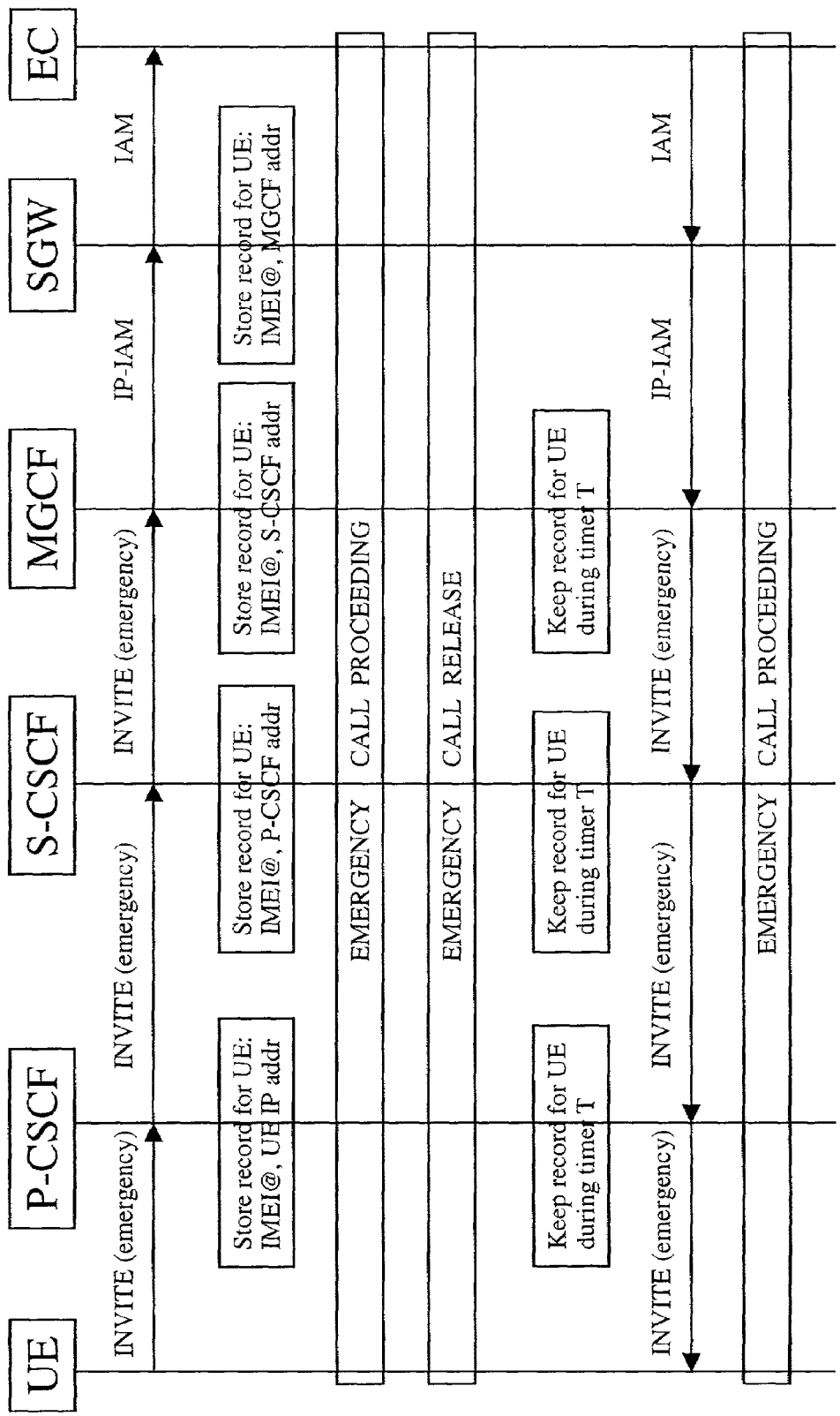
FIG. 1 illustrates a basic structure and message flow of an embodiment of a communication system and method enabling callback in an emergency case.

In the embodiment of the invention shown in FIG. 1, the (EC) Emergency Center is in the CS (switched circuit) domain. The UE is in the PS (packet-switched) domain. The PS (packet-switched) domain includes a P-CSCF (Proxy Call State Control Function), a S-CSCF (Serving Call State Control Function), and a MGCF (Media Gateway Control Function). A SGW (Signaling Gateway) provides signaling interworking between the CS-based network containing the EC and the packet-based IP network containing P-CSCF, S-CSCF and MGCF.

All IMS nodes P-CSCF, S-CSCF, MGCF, and SGW (IMS=IP Multimedia Subsystem) store the IP address of the next IMS node ("next" referring to the node to which the signalling is addressed from the actual node in case of call-back) and the equipment identity during a certain time (e.g. 5 min or another value between 1 to 10 min), defined e.g. by a timer provided in the node, to initiate a new session towards the UE if callback is needed. The P-CSCF stores UE IP address and the equipment identity, the S-CSCF stores P-CSCF IP address and the equipment identity, and MGCF stores S-CSCF IP address and the equipment identity. The SGW stores MGCF IP address and the equipment identity. In case there is a one-to-one relation between MGCF and SGW, the SGW permanently knows the MGCF address and does not have to store the MGCF address for the actual session).

Also emergency center EC knows SGW SS7 address and the equipment identity which are stored in EC or a database accessible to EC.

For establishing an emergency session, the UE sends to the P-CSCF a call set-up message, preferably a SIP (Session Initiation Protocol) message such as an INVITE message. This message preferably includes an indication of emergency session. If the indication is missing then the P-CSCF shall detect the emergency session. The P-CSCF stores information, i.e. a record for UE, e.g. "IMEI@, UE IP address", and forwards the call set-up message, e.g. INVITE message to the S-CSCF which responds by storing information, i.e. a record for UE, e.g. "IMEI, P-CSCF address", and forwarding the call set-up message, e.g. INVITE message, to the MGCF. The MGCF again stores information, i.e. a record for UE, e.g. "IMEI, S-CSCF address", and sends an IP-IAM (Internet Protocol Initial Address Message) to the SGW. The SGW also stores information, i.e. a record for UE, e.g. "IMEI, MGCF address", and sends an IAM (Initial Address Message) to the EC.

The emergency session is then normally handled as indicated in FIG. 1 by block "EMERGENCY CALL PROCEEDING".

If the emergency session should be prematurely released, e.g. before normal completion thereof, as indicated by block "EMERGENCY CALL RELEASE" the EC starts a callback procedure as shown in FIG. 1.

In detail, the EC sends an IAM message with the equipment identity (e.g. in the Calling Line Identity parameter) to the SGW. The SGW uses the equipment identity to find the MGCF IP address and it uses the MGCF IP address to send an IP-IAM message with the equipment identity to the MGCF. The MGCF uses the equipment identity to find the S-CSCF IP address and it uses the S-CSCF IP address to send an emergency initiation message, e.g. INVITE, to the S-CSCF. The S-CSCF uses the equipment identity to find the P-CSCF IP address and it uses the P-CSCF IP address to forward the emergency initiation message, e.g. INVITE, to the P-CSCF. The P-CSCF uses the equipment identity to find the UE IP address and it uses the UE IP address to send an emergency initiation message, e.g. INVITE, to the UE. The P-CSCF may remove the equipment identity from an emergency initiation message, e.g. INVITE before sending it to the UE.

Thereafter, the emergency call proceeding can be continued in the customary manner.

Figure 2:
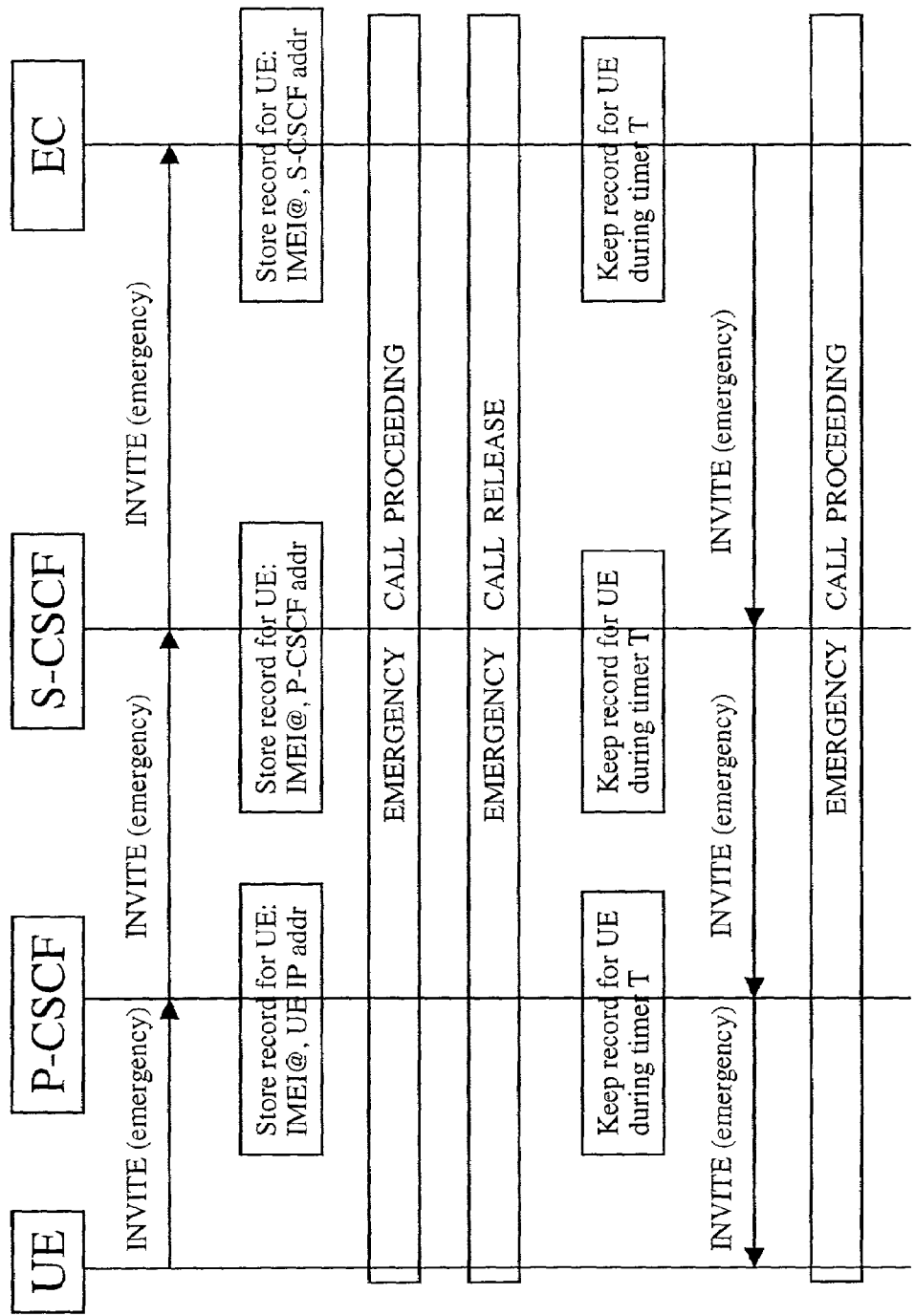
FIG. 2 shows a basic structure and message flow of another embodiment of a communication system and method enabling callback in an emergency case.

In the embodiment shown in FIG. 2, the emergency center EC is in the IMS domain. Hence no MGCF or SGW is needed.

All IMS nodes store the IP address of the next IMS node during and the equipment identity a certain predetermined time (e.g. 5 min) defined e.g. by a timer provided in the node, to initiate a new session towards the UE if callback is needed. The P-CSCF stores UE IP address and the equipment identity, the S-CSCF stores P-CSCF IP address and the equipment identity, and the Emergency center stores S-CSCF IP address and the equipment identity.

In detail, for establishing an emergency session, the UE sends to the P-CSCF a call set-up message, preferably a SIP (Session Initiation Protocol) message such as an INVITE message. This message should include an indication of emergency session. If the indication is missing then the P-CSCF shall detect the emergency session. The P-CSCF stores a record for UE, e.g. "IMEI, UE IP address", and forwards the call set-up message, e.g. INVITE message to the S-CSCF which responds by storing a record for UE, e.g. "IMEI, P-CSCF address", and forwarding the call set-up message, e.g. INVITE message, to the EC. The EC stores a record for UE, e.g. "IMEI, S-CSCF address", and initiates the emergency session.

If the emergency session should be released before normal completion thereof as indicated by block "EMERGENCY CALL RELEASE" the EC starts a callback procedure as shown in FIG. 2.

When call-back takes place then EC sends INVITE message (according to the IP address) and the equipment identity. In detail, the EC sends an emergency initiation message, e.g. INVITE with the equipment identity, to the S-CSCF using the IP address thereof as stored in its record for UE. The S-CSCF uses the equipment identity to find the P-CSCF IP address and it uses the P-CSCF IP address to send the emergency initiation message, e.g. INVITE, to the P-CSCF. The P-CSCF uses the equipment identity to find the UE IP address and it uses the UE IP address to send an emergency initiation message, e.g. INVITE, to the UE. The P-CSCF may remove the equipment identity from an emergency initiation message, e.g. INVITE before sending it to the UE.

Thereafter, the emergency call proceeding can be continued in the customary manner.

Thus, the address, e.g. IP address, of the next node is derived using the equipment identity. The equipment identity is, in this embodiment, the key for finding the IP address. The equipment identity and IP address are used as a pair.

In the preferred embodiments of the invention, the signalling bearer is preferably kept during certain time from the beginning of the signalling bearer activation.

The identity of the equipment can also be sent from SGW to EC or vice versa in an ISUP message (i.e. IAM). The identity can be carried in the Calling Line Identity parameter of the ISUP message. This feature not only applies with regard to the case of callback but can also be used generally as well.

Although the invention has been described above with reference to specific embodiments, the scope of the invention also covers any alterations, additions, modifications, and omissions of the disclosed features.

The invention claimed is:

1. A method for enabling a call-back from an entity to an user equipment initiating a session comprising:
    when the user equipment initiates a session, the user equipment sends a session setup message for initiating the session to a first node, wherein the first node stores a first record for the user equipment for a predetermined time, the first record including an address and an identity of the user equipment and the first node forwards the session setup message to a second node;
    the second node stores a second record for the user equipment for a predetermined time which second record includes the address of the first node and the identity of the user equipment and the second node forwards the session setup message to a third node or an emergency center;
    the third node or the emergency center stores a third record for the user equipment for a predetermined time which third record includes the address of the second node and the identity of the user equipment;
    in case of a call-back, the entity comprises the third node or the emergency center and uses the stored identity of the user equipment to find and in the third record the address of the second node and the third node or the emergency center sends to the second node a message related to the call-back which includes the identity of the user equipment;
    the second node uses the user equipment identity included in the message, received from the third node related to the call-back to find in the second record the address of the first node and the second node sends to the first node a message related to the call-back includes the identity of the user equipment; and
    the first node uses the user equipment identity included in the message received from the second node related to the call-back to find in the first record an address of the user equipment and the first node sends to the user equipment a session initiation message.

2. A method in accordance with claim 1 wherein:
    the session is an emergency session.

3. A method in accordance with claim 1 wherein:
    the message is a SIP message.

4. A method in accordance with claim 1 comprising:
    establishing the session with a signalling bearer which is maintained for a predetermined time from a beginning of activation of the signalling bearer.

5. A method in accordance with claim 1 wherein:
    the nodes are IMS nodes and include at least one of a P-CSCF, S-CSCF or a MGCF node.

6. A method in accordance with claim 1 wherein:
    the first and second nodes and the third node or the emergency center include a timer for measuring the predetermined time.

7. A method in accordance with claim 1 wherein:
    if a session is released before a normal completion thereof, the third node or the emergency center starts the call-back.

8. A method in accordance with claim 1 wherein:
the third node or the emergency user equipment is in a circuit switched domain.

9. A method in accordance with claim 8 wherein:
the user equipment identity is carried in a calling line identity parameter of a ISUP message to a signalling gateway.

10. A system in accordance with claim 1 comprising:
a signalling bearer for establishing the session which is maintained for a predetermined time from a beginning of activation of the signalling bearer.

11. A system in accordance with claim 1 wherein:
if a session is released before a normal completion thereof, the third node or the emergency center starts the call-back.

12. A system comprising first and second nodes and a third node or an emergency center and an user equipment for enabling a call-back from the third node or the emergency center to an user equipment initiating a session; wherein
when the user equipment initiates a session, the user equipment sends a session setup message for initiating the session to a first node, wherein the first node stores a first record for the user equipment for a predetermined time which includes an address and an identity of the user equipment and the first node forwards the session setup message to the second node;
the second node stores a second record for the user equipment for a predetermined time which second record includes the address of the first node and the identity of the user equipment and the second node forwards the session setup message to the third node or the emergency center;
the third node or the emergency center stores a third record for the user equipment for a predetermined time which includes the address of the second node and the identity of the user equipment;
in case of a call-back, the third node or the emergency center uses the stored identity of the user equipment to find in the third record the address of the second node and the third node or the emergency center sends to the second node a message related to the call-back which includes the identity of the user equipment;
the second node uses the user equipment identity included in the message received from the third node related to the call-back to find in the second record the address of the first node and the second node sends to the first node a message related to the call-back which includes the identity of the user equipment; and
the first node uses the user equipment identity included in the message received from the second node related to the call-back to find in the first record an address of the user equipment and the first node sends to the user equipment a session initiation message.

13. A system in accordance with claim 12 wherein:
the session is an emergency session.

14. A system in accordance with claim 12 wherein:
the message is a SIP message.

15. A system in accordance with claim 12 wherein:
the nodes are IMS nodes and include at least one of a P-CSCF, S-CSCF or a MGCF node.

16. A system in accordance with claim 12 wherein:
the first and second nodes and the third node or the emergency center include a timer for measuring the predetermined time.

17. A system in accordance with claim 12 wherein:
the third node or the emergency user equipment is in the circuit switched domain.

18. A system in accordance with claim 12 wherein:
the user equipment identity is carried in a calling line identity parameter of a ISUP message to a signalling gateway.

19. A node in a system comprising first and second nodes and a third node or an emergency center and an user equipment for enabling a call-back from the third node or the emergency user equipment to an user equipment initiating a session and wherein, when the user equipment initiates a session, the user equipment sends a session setup message for initiating the session to a first node, wherein the first node stores a first record for the user equipment for a predetermined time which includes an address and an identity of the user equipment and the first node forwards the session setup message to the second node, the second node stores a second record for the user equipment for a predetermined time which includes the address of the first node and the identity of the user equipment and the second node forwards the session setup message to the third node or the emergency center, the third node or the emergency center stores a third record for the user equipment for a predetermined time which includes the address of the second node and the identity of the user equipment, in case of a call-back the third node or the emergency center uses the stored identity of the user equipment to find in the third record the address of the second node and the third node or the emergency center sends to the second node a message related to the call-back including the identity of the user equipment, the second node uses the user equipment identity included in the message received from the third node related to the call-back to find in the second record the address of the first node and the second node sends to the first node a message related to the call-back including the identity of the user equipment, and the first node uses the user equipment identity included in the message received from the second node related to the call-back to find in the first record an address of the user equipment and the first node sends to the user equipment, a session initiation message, the node comprising:
means for storing the record for the user equipment; and
means for generating and forwarding the session message to another node or the emergency center.

20. A node in accordance with claim 19 wherein:
the node comprises the first node.

21. A node in accordance with claim 19 wherein:
the node comprises the second node.

22. A node in accordance with claim 19 wherein:
the node comprises the third node.

23. A node in accordance with claim 19 comprising:
means for receiving the session setup message;
means for receiving a call-back message from another node or the emergency center; and
means for forwarding the call-back message to another node.

24. An emergency center in a system comprising first and second nodes and the emergency center and an user equipment for enabling a call-back from the emergency user equipment to an user equipment initiating a session and wherein, when the user equipment initiates a session, the user equipment sends a session setup message for initiating the session to a first node, wherein the first node stores a first record for the equipment for a predetermined time which includes an address and an identity of the user equipment and the first node forwards the session setup message to the second node, the second node stores a second record for the user equipment for a predetermined time which includes the address of the first node and the identity of the user equipment and the second node forwards the session setup message to the emergency center, the emergency center stores a third record for the user equipment for a predetermined time which includes the address of the second node and the identity of the user equipment, in case of a call-back the emergency center uses the stored identity of the user equipment to find in the third record the address of the second node and the emergency center sends to the second node a message related to the callback including the identity of the user equipment, the second node uses the user equipment identity included in the message received from the third node related to the call-back to find in the second record the address of the first node and the second node sends to the first node a message related to the call-back including the identity of the user equipment, and the first node uses the user equipment identity included in the message received from the second node related to the call-back to find in the first record an address of the user equipment and the first node sends to the user equipment, a session initiation message, the emergency center comprising:

means for storing the record for the user equipment; and means for receiving the session message from the second node.

25. An emergency node in accordance with claim 24 comprising:

means for forwarding the call-back message to the second node.

\* \* \* \* \*